(12) United States Patent
Yu et al.

(10) Patent No.: US 7,607,577 B1
(45) Date of Patent: Oct. 27, 2009

(54) METHOD AND SYSTEM FOR ANALYZING INVENTORY PURCHASING OPPORTUNITIES WITH RESPECT TO INVENTORY HEALTH

(75) Inventors: Gang Yu, Mercer Island, WA (US); Russell Allgor, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 756 days.

(21) Appl. No.: 11/299,860

(22) Filed: Dec. 12, 2005

Related U.S. Application Data

(60) Provisional application No. 60/728,207, filed on Oct. 19, 2005.

(51) Int. Cl.
*G06K 19/00* (2006.01)
(52) U.S. Cl. .................................. 235/383; 235/375
(58) Field of Classification Search ................. 235/383, 235/375, 379, 385; 705/22, 28
See application file for complete search history.

(56) References Cited

U.S. PATENT DOCUMENTS

| | | | |
|---|---|---|---|
| 5,237,496 A | 8/1993 | Kagami et al. |
| 5,570,291 A | 10/1996 | Dudle et al. |
| 5,608,621 A | 3/1997 | Caveney et al. |
| 5,615,109 A | 3/1997 | Eder |
| 5,870,733 A | 2/1999 | Bass et al. |
| 6,044,356 A | 3/2000 | Murthy et al. |
| 6,154,728 A | 11/2000 | Sattar et al. |
| 6,366,890 B1 | 4/2002 | Usrey |
| 6,397,226 B1 | 5/2002 | Sage |
| 6,631,413 B1 | 10/2003 | Aggarwal et al. |
| 6,671,673 B1 | 12/2003 | Baseman et al. |
| 6,754,637 B1 | 6/2004 | Stenz |
| 6,757,689 B2 | 6/2004 | Battas et al. |
| 6,826,538 B1 | 11/2004 | Kalyan et al. |
| 6,836,773 B2 | 12/2004 | Tamayo et al. |
| 6,845,909 B2 | 1/2005 | Bong et al. |
| 6,847,934 B1 | 1/2005 | Lin et al. |
| 6,868,397 B1 | 3/2005 | McCaslin |
| 6,910,017 B1 | 6/2005 | Woo et al. |

(Continued)

OTHER PUBLICATIONS

U.S. Appl. No. 11/077,432, filed Mar. 10, 2005.

(Continued)

*Primary Examiner*—Edwyn Labaze
(74) *Attorney, Agent, or Firm*—Robert C. Kowert; Meyertons, Hood, Kivlin, Kowert & Goetzel, P.C.

(57) ABSTRACT

A method and system for determining analyzing an inventory purchasing opportunity with respect to inventory health. A method may include receiving an offer to purchase units of an inventory item via a purchasing channel for a purchase price per unit; determining a rate of sales demand of the item; and determining a breakeven holding time of existing units of the item, where a cost of holding a unit until the breakeven holding time equals, within an equality threshold, a difference between a sales channel value and the offer purchase price. The method may additionally include determining a healthy inventory level of the item that exceeds a target inventory level by a function of the sales demand rate and the breakeven holding time, and, if a current inventory level of the item exceeds the healthy level, declining to purchase units of said inventory item for the purchase price.

32 Claims, 6 Drawing Sheets

U.S. PATENT DOCUMENTS

| | | | |
|---|---|---|---|
| 6,931,347 B2 | 8/2005 | Boedi et al. |
| 6,963,847 B1 | 11/2005 | Kennedy et al. |
| 7,069,234 B1 | 6/2006 | Cornelius et al. |
| 7,092,929 B1 | 8/2006 | Dvorak et al. |
| 7,124,941 B1 | 10/2006 | O'Connell |
| 7,133,848 B2 | 11/2006 | Phillips et al. |
| 7,146,327 B1 | 12/2006 | Howard et al. |
| 7,212,976 B2 | 5/2007 | Scheer |
| 7,228,287 B1 | 6/2007 | Samson et al. |
| 7,231,354 B1 | 6/2007 | Rooks et al. |
| 7,251,611 B2 | 7/2007 | Abbott et al. |
| 2002/0069079 A1 | 6/2002 | Vega |
| 2002/0072999 A1 | 6/2002 | Andres et al. |
| 2002/0099631 A1 | 7/2002 | Vanker et al. |
| 2002/0116348 A1 | 8/2002 | Phillips et al. |
| 2002/0147630 A1 | 10/2002 | Rose et al. |
| 2002/0147666 A1 | 10/2002 | Baseman et al. |
| 2002/0147767 A1 | 10/2002 | Brice et al. |
| 2002/0156684 A1 | 10/2002 | Stone et al. |
| 2002/0156884 A1 | 10/2002 | Bertram et al. |
| 2003/0004750 A1 | 1/2003 | Teraoka et al. |
| 2003/0009416 A1 | 1/2003 | Mara |
| 2003/0028457 A1 | 2/2003 | Costa et al. |
| 2003/0046156 A1 | 3/2003 | Cromer et al. |
| 2003/0130966 A1 | 7/2003 | Thompson et al. |
| 2003/0233246 A1 | 12/2003 | Snapp et al. |
| 2004/0059627 A1 | 3/2004 | Baseman et al. |
| 2004/0068459 A1 | 4/2004 | Goulet et al. |
| 2004/0199397 A1 | 10/2004 | Dresden |
| 2004/0215544 A1 | 10/2004 | Formale et al. |
| 2004/0249711 A1 | 12/2004 | Walker et al. |
| 2005/0131779 A1 | 6/2005 | Kitamura et al. |
| 2005/0154630 A1 | 7/2005 | Lin et al. |
| 2006/0122881 A1 | 6/2006 | Walker et al. |
| 2006/0161504 A1 | 7/2006 | Walser et al. |

OTHER PUBLICATIONS

U.S. Appl. No. 11/076,844, filed Mar. 10, 2005.
U.S. Appl. No. 11/299,870, filed Dec. 12, 2005.
SellerEngine FAQ, Feb. 2005, downloaded from http://web.archive.org/web20050220024916/www.sellerengine.com/faq.htm, pp. 1-5.
SellerEngine general overview, Feb. 2005, downloaded from http://web.archive.org/web/20050222005850/http://www.sellerengine.com/SellerEngine.htm, pp. 1-3.
SellerEngine product overview, Feb. 2005, downloaded from http://web.archive.org/web/20050121013225/www.sellersengine.com/trialguide.htm, pp. 1-2.
Fillz FAQ, Feb. 2005, downloaded from http://web.archive.org/web/20050212084321/http://www.fillz.com/faq/cc_inventory, pp. 1-3.
Vendio Overview, Feb. 2005, downloaded from http://web.archive.or/web/20050208103009/http://www.vendio.com/my/smpp/feature_matrix.html, pp. 1-3.
ScoutPal Overview, Feb. 2005, downloaded from http://web.archive.org/web/20050210151425/http://www.scoutpal.com/, 1 page.
Nahmias, Steven (1979), "Simple Approximations for a Variety of Dynamic Leadtime Lost-Sales Inventory Models," Operations Research, vol. 27 (5), 904-924.
Schneider, Helmut (1891), "Effect of Service-Levels on Order-Points or Order-Levels in Inventory Models," International Journal on Production Research, vol. 19 (6), 615-631.
Vendio Feature Matrix, Feb. 2005, downloaded from http://web.archive.org/web/20050208103009/http://www.vendio.com/my/smpp/feature_matrix.html, pp. 1-3.
U.S. Appl. No. 12/428,982, filed Apr. 23, 2009.

METHOD AND SYSTEM FOR ANALYZING INVENTORY PURCHASING OPPORTUNITIES WITH RESPECT TO INVENTORY HEALTH

This application claims benefit of priority to U.S. Provisional Patent Application No. 60/728,207 filed Oct. 19, 2005 titled "Method and System for Inventory Health" which is hereby incorporated by reference herein in its entirety.

BACKGROUND OF THE INVENTION

1. Field of the Invention

This invention relates to inventory management and, more particularly, to analysis of inventory metrics or measurements of inventory health.

2. Description of the Related Art

In order to offer customers a variety of items readily available for delivery, many merchants (whether engaging in electronic or conventional "brick and mortar" commerce) hold various quantities of such items within inventory facilities. Keeping items in inventory may serve to buffer variations in customer demand or a manufacturer or distributor's ability to supply various items. For example, different items offered for sale by a merchant may have different manufacturer lead times. Holding quantities of such items as inventory may enable a merchant to offer consistent availability of these items to customers despite the different lead times.

Many merchants employ conventional inventory management schemes that attempt simply to ensure that the inventory on hand is sufficient to cover expected customer order volumes for a particular period of time. That is, such conventional inventory management schemes focus on whether there is enough inventory on hand to meet projected demand. However, storing inventory is not without cost. For example, providing a physical facility in which to store inventory presents recurring infrastructure costs directly attributable to the inventory items stored in the facility. Further, while items are in storage awaiting sale, debt or capital costs associated with acquiring the items may accumulate. Items being held in inventory may also depreciate, become obsolete, expire or spoil (e.g., in the case of perishable items), become damaged, or otherwise incur costs attributable to holding. When these various inventory holding costs are considered, having too much inventory may also be a concern, as accumulating costs may erode inventory value.

However, taking holding costs into account when optimizing inventory presents challenges. The price paid to acquire a given amount of inventory typically represents a sunk cost that may not correlate with the current value of that inventory, which may obscure actions that may be necessary to maximize the current inventory value. Further, the problem of maximizing inventory value is complicated by purchase opportunities that, on their surface, may appear to be desirable, but which may actually have a deleterious effect on overall inventory value.

SUMMARY

Various embodiments of a method and system for analyzing an inventory purchasing opportunity with respect to inventory health are disclosed. According to one embodiment, a method may include receiving an offer to purchase units of an inventory item via a purchasing channel for a given purchase price per unit and determining a time rate of sales demand of units of the given inventory item per unit of time. The method may also include determining a breakeven holding time of existing units of the inventory item, where a cost of holding a given existing unit until the breakeven holding time equals, within an equality threshold, a difference between a sale value for sale of the given inventory item through a sales channel and the purchase price specified by the offer.

The method may further include determining a healthy inventory level of the inventory item, where the healthy inventory level exceeds a target inventory level by a mathematical function of the time rate of sales demand and the breakeven holding time, and in response to determining that a current inventory level of the inventory item exceeds the healthy inventory level, declining to purchase the units of the inventory item for the given purchase price.

Figure 1:
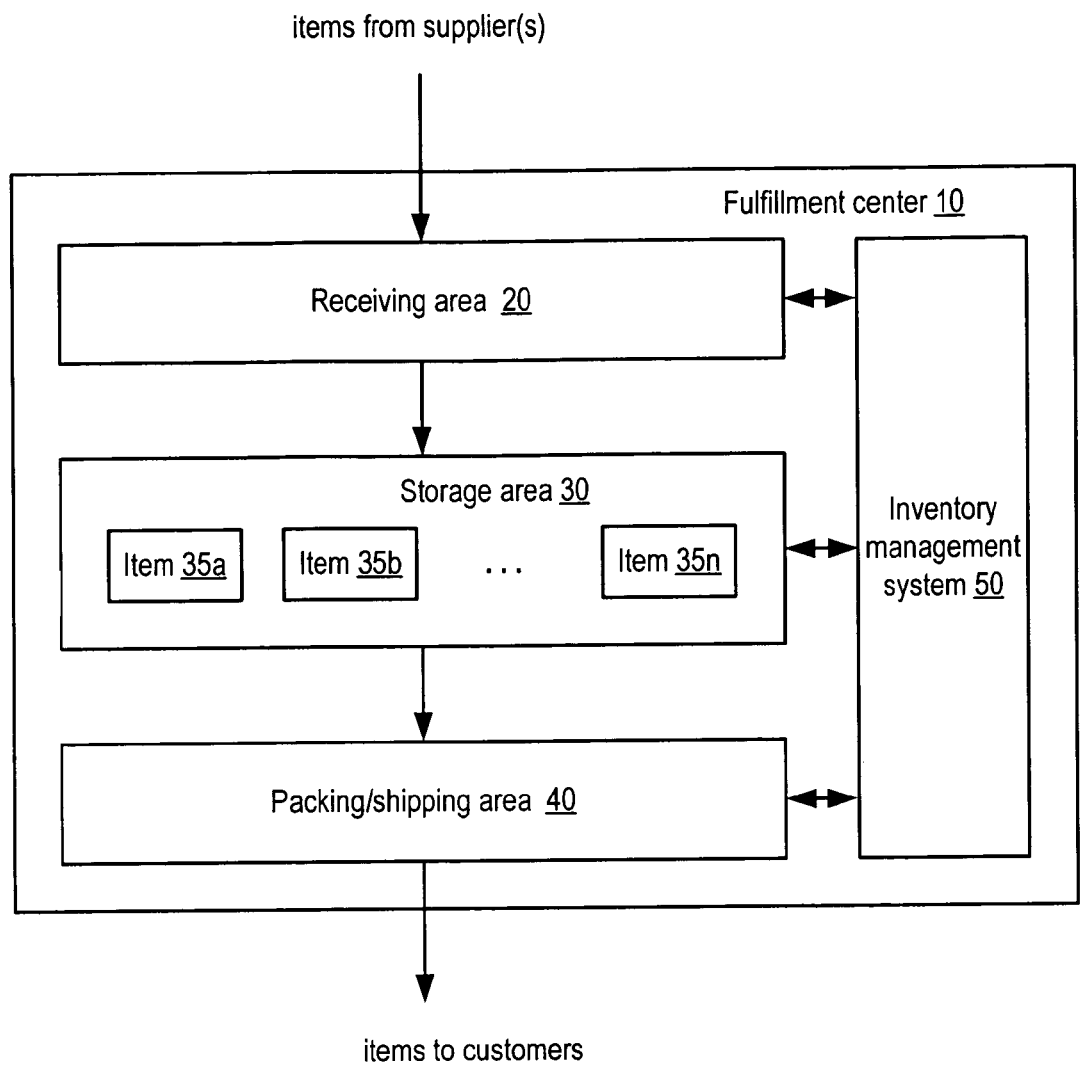
FIG. 1 is a block diagram illustrating one embodiment of a fulfillment center.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Inventory Management Using Inventory Metrics

One embodiment of a fulfillment center configured to store inventory items is illustrated in FIG. 1. In the illustrated embodiment, fulfillment center 10 includes a receiving area 20, a storage area 30 configured to store an arbitrary number of items 35a-n, and a packing/shipping area 40. The arrangement of the various areas within the illustrated embodiment of fulfillment center 10 is depicted functionally rather than schematically. For example, in some embodiments, it is noted that multiple different receiving areas 20, storage areas 30 and packing/shipping areas 40 may be interspersed rather than segregated. Additionally, fulfillment center 10 includes an inventory management system 50 configured to interact with each of receiving area 20, storage area 30 and packing/shipping area 40.

Fulfillment center 10 may be configured to receive different kinds of items 35 from various suppliers and to store them until a customer order specifying particular ones of items 35 is received. The particular items 35 may then be selected from storage and sent to the customer. The general flow of items through fulfillment center 10 is indicated using arrows. Specifically, in the illustrated embodiment, items 35 may be received from one or more suppliers, such as manufacturers, distributors, wholesalers, etc. at receiving area 20. In various embodiments, items 35 may include merchandise, commodities, perishables, or any suitable type of item depending on the nature of the enterprise that operates fulfillment center 10. Upon being received from a supplier at receiving area 20, items 35 may be prepared for storage. For example, in some embodiments items 35 may be unpacked or otherwise rearranged, and inventory management system 50 (which, as described below, may include one or more software applications executing on a computer system) may be updated to reflect the type, quantity, condition, cost or any other suitable parameters with respect to newly received items 35. It is noted that items 35 may be stocked, managed or dispensed in terms of countable, individual units or multiples of units, such as packages, cartons, crates, pallets or other suitable aggregations. Alternatively, some items 35 such as bulk products, commodities, etc. may be stored in continuous or arbitrarily divisible amounts that may not be inherently organized into countable units. Such items 35 may be managed in terms of measurable quantities such as units of length, area, volume, weight, time duration or other dimensional properties characterized by units of measurement. Generally speaking, a quantity of an item 35 may refer to either a countable number of individual or aggregate units of an item 35 or a measurable amount of an item 35, as appropriate.

After arriving through receiving area 20, items 35 may be stored within storage area 30. In some embodiments, like items 35 may be stored together in bins, on shelves or via other suitable storage mechanisms, such that all items 35 of a given kind are stored in one location. In other embodiments, like items 35 may be stored in different locations. For example, to optimize retrieval of certain items 35 having high turnover within a large physical facility, those items 35 may be stored in several different locations to reduce congestion that might occur at a single point of storage.

When a customer order specifying one or more of items 35 is received, the corresponding items 35 may be selected or "picked" from storage area 30. In various embodiments, item picking may range from minimally automated to completely automated picking. For example, in one embodiment fulfillment center employees may pick items 35 using written or electronic pick lists derived from customer orders, while in another embodiment conveyor belts and robotics may be used to pick and transfer items 35. After the items 35 corresponding to a particular order are picked, they may be processed at packing/shipping area 40 for delivery to the customer. For example, items may be packaged for shipment to the customer using a common carrier, or simply bagged or otherwise prepared for direct transfer to a customer, e.g., at an order pickup counter. In some embodiments, further interaction with inventory management system 50 may occur when items 35 are picked from storage area 30 and/or processed at packing/shipping area 40, for example to update inventory records to reflect the removal of inventory, to record revenue for the sale or other transaction (e.g., lease, rental, exchange, etc.) and so forth.

Management of items 35 stored as inventory within fulfillment center 10 presents complex optimization problems. Generally speaking, the level of inventory of a given item 35 may affect the quality of service associated with providing the given item to a customer. Quality of service may encompass factors such as general availability and selection of items 35, timeliness of order completion, or any other factors relevant to a customer's perceived experience in conducting business relating to items 35. As an example of the interaction between inventory levels and quality of service, if a particular item 35 ordered by a customer is not in stock within fulfillment center 10, the customer may be forced to wait for delivery until that particular item 35 can be obtained, or the customer may cancel the order resulting in a lost sale. Consequently, keeping a number of units of items 35 on hand may assist in the timely fulfillment of orders and increase customer satisfaction. A larger inventory, for example, may more readily accommodate unexpected increases in customer demand.

However, various costs are typically associated with holding items 35 in storage for any period of time. In some embodiments, holding a unit of an item 35 in storage within storage area 30 may incur incremental storage costs. For example, the cost of providing fulfillment center 10 in which items 35 may be stored may include recurring real estate costs (e.g., lease costs, debt service, etc.), personnel costs, facilities costs (e.g., utilities, maintenance, etc.) and any other costs associated with fulfillment center 10. In one embodiment, such costs may be incrementally apportioned to a given unit of an item 35 according to an area or volume of storage space occupied by that unit. For example, storage costs may be applied to each unit of each item 35 at a rate of dollars per square/cubic foot of item volume per unit of storage time (day, week, month, etc.). In other embodiments, different cost allocation methods may be employed. For example, in one embodiment the costs of providing special storage or handling, such as refrigeration, controlled atmosphere, etc. may exclusively be allocated to those items 35 that require such measures, rather than averaging those costs across all items 35. Similarly, in one embodiment, storage may include temporary capacity (e.g., short-term leased space, seasonal overflow capacity, etc.) as well as permanent capacity (e.g., owned space, year-round capacity, etc.), each of which may have different cost characteristics. Correspondingly, in some such embodiments items 35 stored within a particular type of facility may exclusively incur costs of the particular type of facility according to their storage utilization (e.g., area, volume, etc.). Alternatively, storage costs may be allocated to items 35 based upon their value or sales volume as opposed to their size. In some embodiments, additional costs associated with obtaining a given item 35, such as transportation/handling costs charged by a supplier or incurred by eventual shipment to a customer, may be included within storage costs for that given item 35.

In addition to storage costs, in some embodiments, holding a unit of an item 35 in storage may incur capital or economic costs related to the price paid to obtain the item. That is, once working capital or cash flow is committed to a unit of an item 35 (e.g., once that unit is paid for), that economic value is not available for other purposes; the committed value is "tied up" in the corresponding inventory. Depending on the accounting scheme used to manage the costs of inventory, a cost of debt or other time-value-of-money cost (also referred to as an economic cost) may be associated with the price paid for a given unit of an item 35. For example, in one embodiment an effective annual interest rate of 6% may be applied to the price paid for a unit of inventory and may continue to accrue until that unit is sold or otherwise disposed of. In some embodiments, economic costs may be applied to storage costs in addition to the price paid for a unit of inventory. In certain cases, negative economic costs may also be associated with units of items 35. For example, a supplier may offer a rebate for an item 35 that effectively reduces its cost.

Other types of costs may also be associated with holding units of items 35 in storage. For example, in the ordinary course of operation of fulfillment center 10, items 35 may be subject to loss or damage due to accidents or mishaps. A rate of loss, or a corresponding rate of insurance against such loss, may be included within an overall cost of holding a unit of an item 35. Also, over time, items 35 may depreciate, expire, spoil or become obsolete, which may also be expressed as part of a cost of holding such items 35.

Disposition Value and Inventory Health

Figure 2:
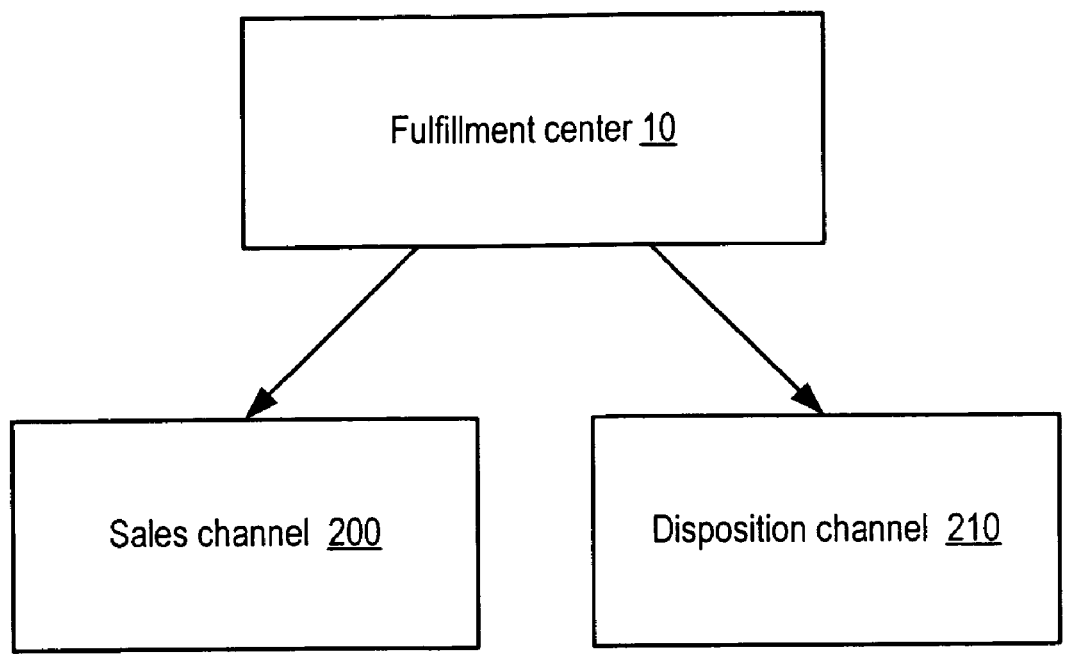
FIG. 2 is a block diagram illustrating one embodiment of a sales channel and a disposition channel.

As noted above, holding a larger inventory of an item 35 may better enable an enterprise to absorb fluctuations in demand for that item. However, in some circumstances, the various elements of holding cost may erode some of the advantages of holding inventory. For example, at a given point in time, an enterprise may have at least two options with respect to a unit of a particular item 35, as shown in FIG. 2. The enterprise may hold the unit within fulfillment center 10 until it is sold to a customer through a sales channel 200, or may dispose of the unit as soon as possible through a disposition channel 210. As described in greater detail below, while a sales channel may generally yield a higher price for a unit than a disposition channel, holding costs that accrue until such a sale occurs may diminish the extra revenue received.

Generally speaking, sales channel 200 may encompass any suitable method, technique or relationship for conducting a transaction with a typical customer of an enterprise, in response to an actual or expected customer order or request. Sales channel 200 may include various features configured to present to customers information about items 35 (e.g., availability and pricing information, product details, images, etc.) as well as features configured to support the receipt and processing of customer orders or requests. For example, a retail enterprise that generally sells merchandise to end consumers (e.g., as merchandise not generally intended for resale as new) may sell through an online, web-based channel 200 that may include an online catalog or portal configured to display information about items 35, a web-based order entry system such as a virtual shopping cart or other system, a status tracking tool through which customers may track the status or progress of orders, a search engine, or any of a number of other features suitable for promoting the conduction of sales transactions.

An enterprise may also engage in customer transactions using other types of sales channels 200 or multiple such channels. For example, sales channel 200 may encompass a catalog channel 200, through which customers may receive information about items 35 via a catalog and provide orders through physical order forms or via telephone, or a physical store channel 200, through which customers may receive information about and order or purchase items 35 in person. Manufacturers or distributors may similarly engage in sales of items 35 through sales channels 200 appropriate to their position within the supply chain. It is noted that in some embodiments, a unit of an item 35 may be rented, leased or licensed to a customer via sales channel 200 under specific terms in exchange for revenue or other economic consideration. The term "sale" may be used herein to generically describe any suitable transaction involving an item 35 resulting in either direct or indirect (e.g., imputed or tangential) revenue, and is intended to encompass rentals, leases, subscriptions, and other types of revenue models.

By contrast, disposition channel 210 may generally encompass any suitable method, technique or relationship for disposing of units of an item 35 as an alternative to sale through a sales channel 200. In various embodiments, a disposition channel 210 may include a vendor return channel through which units of an item 35 may be returned to a vendor or supplier for credit, a liquidation channel through which units may be liquidated through a third party, a salvage channel through which units may be disposed for scrap or salvage value, or a donation channel through which units may be donated, e.g., to a charitable cause. In other embodiments, a disposition channel 210 may include a sales channel that is an alternative to sales channel 200. For example, a disposition channel 210 may include a promotional sales channel through which units of an item 35 are offered at a discount (e.g., according to the condition of the units, quantity on hand, or other relevant factors), bundled with units of other items 35 (e.g., as part of a "buy X, get Y free" offer), offered for sale through an auction or bidding process, offered for sale through a promotional or marketing partner affiliated with the enterprise, or any other suitable disposition arrangement. It is contemplated that in some embodiments, different terms and conditions may apply to a sale of an item 35 that occurs through a disposition channel 210 versus a sale that occurs through a sales channel 200. For example, a customer buying a unit of an item 35 via sales channel 200 may receive certain return, exchange, warranty or satisfaction privileges or guarantees that may not apply to purchases of that item 35 through a disposition channel 210.

Generally speaking, the value of a unit of a given item 35 may correspond to the economic consideration that may be obtained for it via a specific channel. For example, a unit of an item 35 may be sold via sales channel 200 for a particular price, which may be indicative of the value of a unit of item 35 with respect to sales channel 200. By contrast, a unit of an item 35 may be disposed of via disposition channel 210 for a different level of economic consideration. For example, the unit may be returned to a vendor for a percentage of the original purchase cost of the unit, sold to a liquidator, or disposed of via any other suitable method such as described above. Economic consideration received in exchange for an item 35 may typically include monetary consideration, but may also include other consideration such as credit relating to current or future transactions, bartered goods or services, or any other form of value agreeable to the parties participating in the exchange.

When considering revenue alone, it may often be preferable to sell a given item 35 via sales channel 200 rather than to dispose of given item 35 via a disposition channel 210. However, an enterprise may have little direct control over when a sale event via sales channel 200 may occur, whereas an enterprise may have considerably greater control over initiating disposition via a disposition channel 210. In certain circumstances, holding costs that accrue until units of an item 35 are sold via sales channel 200 may reduce or even eliminate the difference between the sale value and the disposition value of the units. Consequently, even though greater revenue may be realized by waiting for a sale via sales channel 200 to occur, in certain circumstances overall economic value may be preserved or improved by electing to dispose of units of an item 35 via disposition channel 210.

By examining the value that may be received for a given item 35 via various channels in conjunction with the holding costs associated with given item 35, a breakeven holding time may be determined at which holding costs approximately equal the difference in value between a future sale and a current disposition of given item 35. The breakeven holding time may then be used to determine an inventory policy that may be used to direct actions to be taken against items 35, such as whether to hold or dispose of items 35.

At a general level of abstraction, the logic behind an inventory policy that takes into account a breakeven holding time may be summarized as follows: Suppose an item 35 generally sells through a sales channel for a higher value than is expected to be received by disposing of the item 35 through a disposition channel. Then, it may be expected that any given unit of item 35 may be profitably held for sale via the sales channel until the costs of holding the unit approximately equal the difference in value between the sales channel and the disposition channel. After this point, referred to as the breakeven holding time, accumulated holding costs may exceed the difference in value between the channels. For example, a particular item 35 may have a sale value of ten dollars and a disposition value of five dollars, and may incur holding costs of one dollar per week. Thus, the breakeven holding time for the particular item 35 may be five weeks, at which time the accumulated holding costs may be expected to total five dollars, equal to the difference between the sale and disposition values.

The breakeven holding time may be used in determining a healthy level of inventory. Generally speaking, a healthy level of inventory of an item 35 may correspond to the total expected demand for that item 35 through the breakeven holding time. That is, if the breakeven holding time represents the "tipping point" for an item—the point at which holding costs may be expected to exceed the added value of selling the item through a sales channel vs. a disposition channel—then the total amount of inventory of the item may be considered healthy (e.g., not at risk of incurring excessive holding costs) if the inventory would be expected to be sold via a sales channel prior to the breakeven holding time. In other words, if the inventory on hand of an item is expected to "turn over" (e.g., be sold and possibly replaced) prior to the breakeven holding time, the inventory on hand may be considered healthy. Referring to the previous example, if the demand or sales rate of particular item 35 is two units per week, then given the breakeven holding time of five weeks, a healthy inventory level for the particular item 35 may be ten units.

In one embodiment, a breakeven holding time and a healthy inventory level for an item 35 may be determined as follows. Let v and p respectively represent the disposition value associated with disposing of item 35 via disposition channel 210 (net of associated disposition costs) and the sale value associated with sale of item 35 via sales channel 200, and let b represent the purchase paid to acquire item 35. If more than one disposition channel 210 exists, the disposition channel 210 with the highest current disposition value may be chosen for the analysis. Let h represent the rate of holding cost accrual for a unit of item 35 per unit of time (e.g., dollars per week). The total breakeven holding time $T_{be}$ for item 35 may then be determined by setting the profit realized from disposition of item 35 equal to the profit realized from holding item 35 until the breakeven holding time and solving for $T_{be}$. That is, $$v-b=p-b-hT_{be}. \quad (1)$$

This yields $$T_{be} = \frac{p-v}{h}. \quad (2)$$

Given $T_{be}$, the healthy inventory level H of item 35 may be determined as follows:

$$H = \int_0^{T_{be}} D(t)\,dt, \quad (3)$$

where D(t) represents the demand (e.g., sales demand) for item 35 as a function of time. That is, the definite integral of demand from time 0 (e.g., the current time) through time $T_{be}$ may represent the total expected demand over that interval of time, which may correspond to a healthy inventory level. It is noted that in some embodiments, D(t) may be given by a discrete rather than a continuous function. Correspondingly, discrete summation rather than integration may be employed to determine H.

It is noted that in some embodiments, the accrued holding cost and the difference between current sale and disposition value may not be exactly equal, but rather equal within some equality threshold. That is, two values may be considered equal if their difference is less than the equality threshold, which may be expressed as an absolute value (e.g., a given number of units) or a relative value (e.g., a percentage). For example, units of time or cost may not be arbitrarily divisible. Consequently, rounding or truncation of values may occur during evaluation, which may lead to inexact computation.

In some embodiments, the healthy inventory level H and breakeven time $T_{be}$ may be determined relative to another inventory policy. For example, an enterprise may establish a target inventory level S of a particular item 35 that may be used for planning and managing inventory levels of that item 35. In some embodiments, S may be determined by an optimization process configured to determine an optimal level of inventory given various parameters, such as customer demand, supplier lead time, market dynamics, expected profit margins or other factors. In other embodiments, S may simply be given as an arbitrary inventory level target. Generally speaking, S may be determined in such a way that a desired service level for item 35 will be achieved for at least a period of time T (the "coverage period") with a given degree of certainty. That is, S may denote the amount of inventory needed to cover expected demand to the degree required by the desired service level (e.g., with a certain level of delay or other service parameters) for a period of time T, with a certain probability or certainty. For example, the supply and demand characteristics of a particular item 35 may be analyzed or modeled to determine that 100 units of that item 35 are necessary to provide two weeks of inventory coverage with a probability of 99%.

In some cases, the target inventory level S may not intrinsically take into account inventory health related to holding time, as described above. In one embodiment, a healthy inventory level may be determined relative to a target inventory level as follows. Let $t_{be}$ represent the incremental breakeven holding time for an item 35 relative to T, That is, $$T_{be}=T+t_{be}, \quad (4)$$

although as noted below, in some instances $t_{be}$ may be negative. Substituting equation (4) into equation (1) yields $$v-b=p-b-h(T+t_{be}), \quad (5)$$

and solving for $t_{be}$ yields $$t_{be}=(p-v-hT)/h, \quad (6)$$

It is noted that alternative expressions and derivations are possible. In particular, it is noted that both equations (2) and (6), the breakeven holding time is entirely independent of the purchase price paid to acquire item 35, b. Thus, the expression for breakeven holding time may also be derived by setting the total holding cost accrued until the breakeven holding time equal to the difference between the current sale value and the current disposition value:

$$p-v=h(T+t_{be}) \quad (7)$$

The relative breakeven holding time $t_{be}$ may be generally illustrative of a point in time beyond T at which accrued holding costs of an item 35 begin to exceed the expected value from holding and eventually selling item 35 through a sales channel. Equations (3) and (4) may be combined to yield an inventory health metric that reflects the disaggregation of total holding time $T_{be}$ into a coverage period T and a relative breakeven holding time $t_{be}$ as follows:

$$H = \int_0^{T_{be}} D(t)\,dt = \int_0^T D(t)\,dt + \int_T^{T+t_{be}} D(t)\,dt. \quad (8)$$

However, it is noted that the integral of expected demand over the interval from 0 to T may reflect the accumulated demand throughout the coverage period that is expected to be covered (within a degree of certainty) by the target inventory level S. Thus, equation (8) may be rewritten as:

$$H = S + \int_T^{T+t_{be}} D(t)\,dt. \quad (9)$$

In some instances, the demand over the interval from T to $T+t_{be}$ may be given by an average value D. In such a case, equation (9) may be further simplified to:

$$H = S + Dt_{be}. \quad (10)$$

Generally speaking, in these formulations, the healthy inventory level H may exceed the target by the number of units expected to be sold, according to current demand D, over the incremental period of time given by the breakeven holding period $t_{be}$. By substitution of equation (6), the healthy inventory level may be given in terms of sale channel value, disposition channel value, and holding cost accrual rate as:

$$H = S + D(p-v-hT)/h. \quad (11)$$

According to the foregoing, a unit of item 35 that sells via sales channel 200 after the breakeven holding time may yield a lower value, net of holding costs, than if it were disposed of via disposition channel 210. The number of units that may be expected to sell prior to the breakeven holding time may generally be a function of the demand, and is reflected in the healthy inventory level as shown above. It follows that if a current inventory level I of an item 35 exceeds the healthy inventory level H, for those units of item 35 in excess of the healthy level, greater value may be realized by disposition via disposition channel 210 rather than holding for sale via sales channel 200. That is, those units in excess of H may be considered "unhealthy," in that their value may be expected to be greater at the current time than at some future time. It is noted that if the breakeven holding period $t_{be}$ is a negative value, all units in excess of target inventory level S may be considered unhealthy. In this circumstance, accrued holding costs through the expected time of sale, given as hT, already equal or exceed the difference between the sale and disposition values. Thus, in this case, H=S. In some instances, it may be possible for expected accrued holding costs for some units of S to equal or exceed the difference between the sale and disposition values, and thus be technically "unhealthy." However, in some embodiments, S may be enforced as a minimum required inventory level necessary to ensure a given level of service. Consequently, in such embodiments, H may be constrained to be greater than or equal to S.

As described above, in some embodiments, inventory management system 50 may be configured to record and analyze the state of inventory items 35 within fulfillment center 10. For example, inventory management system 50 may be implemented as one or more software processes configured to execute on one or more computer systems to create records of the arrival, storage, picking, sale, disposition or other events relating to items 35 with respect to fulfillment center 10. In one embodiment, inventory management system 50 may be configured to analyze the inventory of a particular item 35, determine whether the inventory level is healthy or unhealthy in accordance with the model derived above, and initiate or suggest action, such as disposition, to be taken with respect to any unhealthy inventory.

Figure 3:
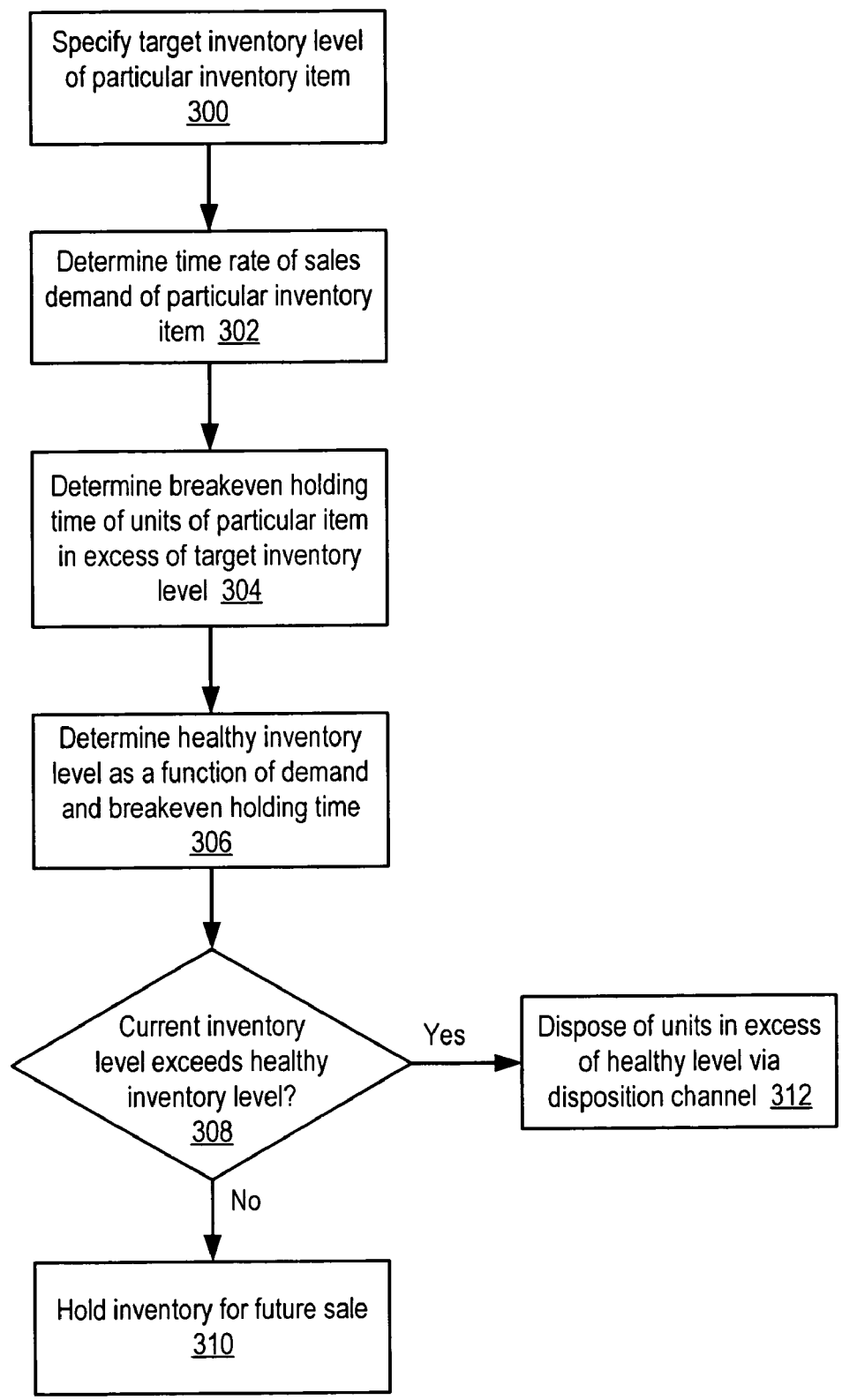
FIG. 3 is a flow diagram illustrating one embodiment of a method of analyzing inventory health.

One embodiment of a method of analyzing inventory health is illustrated in FIG. 3. Referring collectively to FIGS. 1-3, operation begins in block 300 where a target inventory level in units of a particular item 35 is specified. As noted above, in various embodiments the target level of inventory may be dynamically determined by any suitable algorithm or process, or may be statically or manually given. For example, inventory management system 50 may be separately configured to determine the target level of inventory, may receive the target level from a different system, or may include a static record or specification of the target level.

Additionally, the time rate of sales demand of units of the particular item 35 is determined (block 302). In one embodiment, inventory management system 50 may extrapolate sales demand from historical sales activity of the particular item 35. Alternatively, a more sophisticated model internal or external to inventory management system 50 may be configured to generate a prediction of sales demand according to suitable variables, such as seasonality, trends, planned marketing or promotional activity, historical behavior of related items 35, future product plans, or any other factor relevant to demand. As noted previously, sales channel 200 may generally encompass any suitable model of revenue transaction, including rentals, leases, licensing arrangements, etc. Correspondingly, the time rate of sales demand may correspond to demand for any relevant type of transaction that may occur via sales channel 200.

The breakeven holding time of units of particular item 35 in excess of the specified target inventory level is then determined (block 304). Specifically, as described above, the breakeven holding time may be determined such that the cost of holding a given excess unit until the breakeven time equals, within an equality threshold, the difference between a current sale value for sale of the item 35 through a sales channel 200 and a current disposition value for disposition of the item 35 through a disposition channel 210. In one embodiment, inventory management system 50 may be configured to determine current sale and disposition value information and holding cost information for item 35 or to obtain such information from another system, such as a pricing or finance system.

A healthy inventory level of particular item 35 is then determined, where the healthy inventory level exceeds the target inventory level by the product of the time rate of sales demand and the determined breakeven holding time, as described above (block 306). The current inventory level of particular item 35 is then compared against the healthy inventory level (block 308). If the current inventory level does not exceed the healthy inventory level, the inventory of particular item 35 (including inventory in excess of the target inventory level, if any), may be held for future sale (block 310). If the current inventory level does exceed the healthy level, those units of particular item 35 in excess of the healthy level may be disposed of via disposition channel 210 (block 312). In one embodiment, inventory management system 50 may be configured to generate a report or indication notifying a user of the system of the healthy or unhealthy status of inventory and advising that a particular action (e.g., hold or dispose) be taken. That is, inventory management system 50 may merely advise or indicate that an action such as disposition should be taken, while the actual undertaking of the indicated action is performed at the discretion of another agent or system. In other embodiments, inventory management system 50 may be configured to initiate the disposition process if unhealthy inventory exists, for example by contacting a vendor to arrange a return, directing that unhealthy inventory be picked and packaged for return, or other actions suitable to disposition channel 210.

In some embodiments, more than one disposition channel 210 may exist, and such channels 210 may be limited in the number of units that can be disposed of. For example, a vendor may limit the number of returns it will accept to a given number or dollar value of units per month or other time period. Similarly, a liquidator may only accept a certain number of units at a given time. In some such embodiments, the method of FIG. 3 may be applied to each disposition channel 210 in nonincreasing order of disposition value. That is, each subsequent disposition channel 210 to which the method is applied may have a disposition value that is less than or equal to the disposition value of the previous channel. For example, the highest value channel 210 may be selected to perform the breakeven holding time analysis. If unhealthy inventory exists with respect to the highest value channel 210, it may be removed from inventory to the extent that the limitations of the channel allow. The next highest-value channel 210 may then be selected for a similar analysis, and the process may repeat until each disposition channel 210 has been considered.

In the course of performing inventory health analysis, inventory management system 50 may be configured to generate and report a number of different inventory metrics that may be indicative of various aspects of inventory decision quality and health status. For example, the total overstock amount I–S and associated purchase value b(I–S), disposition value v(I–S) and/or expected sale value p(I–S) may be reported. Similar metrics may be reported with respect to unhealthy inventory I–H. Additionally, for unhealthy inventory, unit value loss speed (e.g., given as the holding cost rate h) may be reported as an indication of the rate at which value loss increases due to continued holding cost accrual if disposition action is not taken. In some embodiments, inventory metrics may be defined for individual items 35 as well as in the aggregate for groups of items, such as groupings by product type, manufacturer, etc. Additionally, in enterprises where different items 35 may be associated with different business units or departments for financial or accounting purposes, metrics may be grouped and reported according to organizational units. Numerous other types of inventory metrics may also be generated.

Inventory Health Analysis of Purchase Opportunities

As described above, in one embodiment inventory management system 50 may be configured to ascertain whether a given level of inventory of an item 35 is healthy or unhealthy and to responsively initiate an appropriate action, such as disposition of unhealthy inventory through a disposition channel 210. Such an analysis may be performed, for example, to manage an existing quantity of inventory given its holding costs and sales dynamics. However, in some situations, an enterprise may be required to determine whether a proposed inventory acquisition should be undertaken.

Generally speaking, just as units of a given item 35 may be sold or disposed of through sales or disposition channels having associated sales or disposition values, units of given item 35 may be acquired through a purchasing channel for a purchase price or value. For example, a vendor, manufacturer or other supplier of inventory may present an offer to an enterprise via a purchasing channel to purchase a particular number of units of a given item 35 for a particular price. Such an offer may be constrained in numerous ways: for example, the supplier may require that a minimum quantity be purchased in order to receive a preferred offer price, or the supplier may require that the offer be accepted within a specified time period. A supplier may further constrain that units purchased according to the offer may have restrictions on return or disposition options compared to units purchased under different terms. For example, units purchased under the terms of the offer may be not be returnable, may not be liquidated or resold through certain types of disposition channels 210, or other restrictions may apply. It is noted that, as described above with respect to sales of items 35, the term "purchase" may refer to any suitable type of acquisition transaction, including acquisitions of rights or options, leases, rentals, licensing arrangements, etc.

Such offers may occasionally or frequently represent favorable deals for an enterprise in terms of the overall price paid for units of an item 35. However, as noted above, holding costs of an item 35 may erode the value of item 35 over time, including any potential purchase savings associated with purchases under a constrained offer. If such purchases are made without concern for overall inventory health, the enterprise's goal of maximizing inventory value may be frustrated. However, lengthy analysis of the inventory health implications of an offer may result in a lost opportunity if the offer is not found to be acceptable before it expires.

In the following discussion, methods and techniques are described in which the impacts of a particular purchasing opportunity for an item 35 on the inventory health of that item 35 are analyzed. In one embodiment of such a method, a purchasing opportunity may be treated as a hypothetical disposition opportunity for the purposes of assessing inventory health implications. As described in detail below, if it would be advantageous from an inventory health standpoint to dispose of item 35 via such a hypothetical disposition (e.g., if some portion of the inventory of item 35 would be unhealthy with respect to such a hypothetical disposition channel), the purchasing opportunity may be ill advised. That is, it may be inadvisable to acquire inventory under terms for which one would prefer to dispose of inventory, if the opportunity to dispose were available. In other embodiments of the method described below, additional factors may be taken into account when evaluating a purchasing opportunity, such as determining whether minimum profit margin requirements for the purchased units are expected to be satisfied, optimizing the purchase quantity, etc.

As described in the previous section, a given inventory level of an item 35 may be considered unhealthy if greater value can be expected from disposing of at least some units of that item 35 via a disposition channel 210 instead of waiting for a sale to occur via a sales channel 200. Generally speaking, a given inventory level may be either healthy or unhealthy with respect to any given disposition channel 210, according to the disposition value associated with the channel. That is, for any given disposition value, the given inventory level may be in excess of the healthy inventory level, in which case disposition may be indicated, or below the healthy inventory level, in which case additional inventory may be accumulated without compromising inventory value. (The given inventory level may also be equal to the healthy inventory level, in which case no additional inventory accumulation may be advised, but inventory need not be disposed.)

For any given purchase offer for an item 35 that is being considered by an enterprise, the purchase price associated with the offer may be considered an indication of the value of item 35. If the current inventory level of item 35 is unhealthy with respect to the purchase price, this would indicate that given an opportunity to do so (e.g., given the existence of a disposition channel 210 having a disposition value equal to the purchase price of the offer), inventory value may be improved by disposition of units of item 35 for the value of the purchase price. However, since disposition is the opposite of acquisition, an indication that disposition for the value of the purchase price is a preferable option may correspondingly indicate that purchasing for the indicated price is not preferable. In other words, given any particular value associated with an item 35 as well as the sales price, sales demand and holding cost characteristics described above, it would either be preferable to dispose of units of item 35 for the particular value in question, or to hold those units for future sale (that is, current inventory of item 35 is either unhealthy or healthy with respect to the particular value). If it would be preferable to dispose of units of item 35 in exchange for the particular value, a net acquisition of units of item 35 for the particular value may represent a questionable opportunity. It is noted that no actual opportunity to perform a disposition for the particular value is necessary to conclude that a purchase would not be preferable. Rather, it is the potential impact to inventory health of disposition versus acquisition that may determine a preferable course of action.

Correspondingly, in one embodiment, inventory management system 50 may be configured to analyze an offer to purchase units of an item 35 from a supplier as though the offer were actually an opportunity to dispose of existing inventory of item 35 for a disposition value equal to the purchase offer price. That is, for the purposes of such an analysis, inventory management system 50 may be configured to treat a purchasing channel as a disposition channel. If inventory management system 50 determines that disposition would be indicated given the current inventory state, the purchase offer may be declined.

Figure 4:
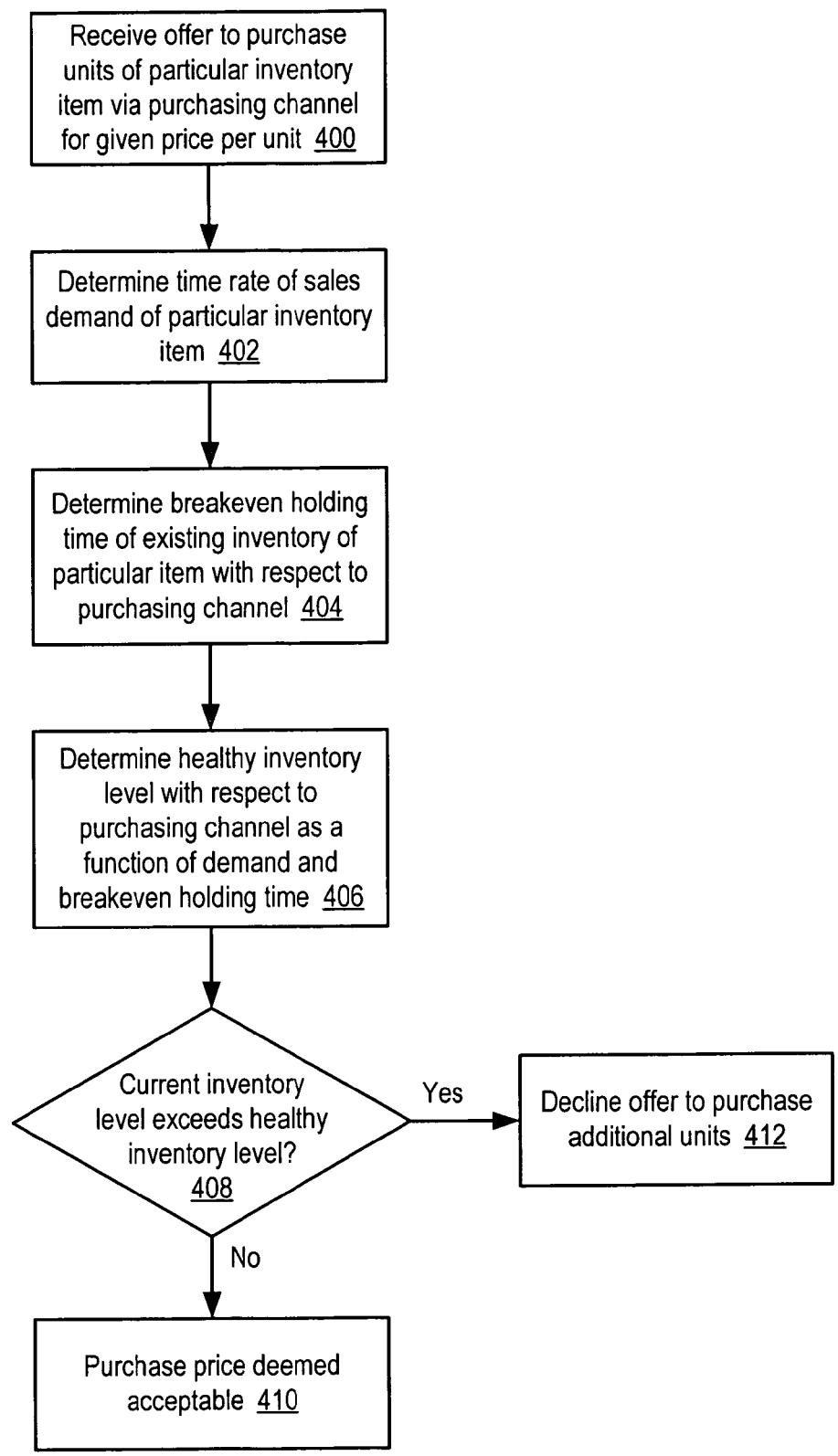
FIG. 4 is a flow diagram illustrating one embodiment of a method of evaluating a purchasing opportunity with respect to inventory health.

One embodiment of a method of analyzing a purchasing opportunity with respect to inventory health is illustrated in FIG. 4. Referring collectively to FIGS. 1-4, operation begins in block 400 where an offer to purchase units of a particular item 35 via a purchasing channel for a given purchase price per unit is received. Receiving a suitable indication specifying the details of the offer, such as a message, may constitute receiving the offer. The offer may or may not specify a minimum or maximum number of units eligible to be purchased. For example, inventory management system 50 may receive such an offer electronically from a supplier. Alternatively, the offer may be electronically received from or manually entered by a buyer for an enterprise who receives the offer from a supplier via another means.

Additionally, the time rate of sales demand of units of the particular item 35 is determined (block 402). In various embodiments, sales demand may be determined through appropriate extrapolation or modeling similar to that described above with respect to block 302 of FIG. 3.

The breakeven holding time of existing units of particular item 35 (e.g., units of item 35 already held in inventory) beyond an expected time of sale of the existing units is then determined with respect to the purchasing channel (block 404). The breakeven holding time determination may be similar to that described above with respect to block 304 of FIG. 3, with the exception that the purchase price specified in the received offer may be used as the disposition value. That is, the purchasing channel corresponding to the received offer may be treated as a disposition channel for the purposes of analyzing the offer. Specifically, as described above, the breakeven holding time may be determined such that the cost of holding a given excess unit until the breakeven time equals, within an equality threshold, the difference between a current sale value for sale of the item 35 through a sales channel 200 and the given purchase price specified in the received offer. In one embodiment, inventory management system 50 may be configured to determine current sale value information and holding cost information for item 35 or to obtain such information from another system, such as a pricing or finance system.

A healthy inventory level of particular item 35 with respect to the purchasing channel is then determined, where the healthy inventory level exceeds a target inventory level by the product of the time rate of sales demand and the determined breakeven holding time, as described above (block 406). In some embodiments, the target inventory level may be separately determined and treated as an input to the purchasing opportunity analysis.

The current inventory level of particular item 35 is then compared against the healthy inventory level (block 408). If the current inventory level exceeds the healthy inventory level as determined with respect to the purchase price, the offer to purchase units of the particular item 35 for the given purchase price may be declined (block 410). In some embodiments, as described in greater detail below, a counteroffer may be made with respect to purchase price or quantity. If the current inventory level does not exceed the healthy inventory level, the purchase price may be deemed acceptable (block 412). The offer may subsequently be accepted, or evaluated with respect to purchase quantity as described below. Further evaluation may result in the offer being accepted or declined or a counteroffer being made. For example, if a given offer that specifies a minimum purchase quantity is deemed unacceptable, in some embodiments the method of FIG. 4 may iterate over possible purchase quantities to determine a purchase quantity that would be acceptable at the offer price. Alternatively, the method of FIG. 4 may iterate over possible offer prices to determine an offer price that would be acceptable at the minimum purchase quantity, or may iterate over both variables concurrently. It is noted that such iterations may take into account any particular price or quantity increments that may be implemented by a particular vendor. For example, a vendor may require that items 35 be ordered in certain multiples of units (e.g., crates, pallets, etc.) rather than individual units. Correspondingly, iteration over purchase quantities may reflect such multiples.

Once it has been determined that a purchase price associated with an offer is acceptable with respect to the breakeven holding time analysis described above, if no minimum purchase quantity is specified in the offer, the number of units of item 35 to be purchased under the offer may be analyzed. According to the above analysis, if the purchase price is deemed acceptable, the healthy inventory level H with respect to the purchase price exceeds the current inventory level I. Thus, in one embodiment, the quantity to be purchased under the offer may be any quantity less than or equal to the difference H−I.

However, more sophisticated optimizations of purchase quantity relative to the offer terms may be performed. In one embodiment, a minimum profit margin M, in units of economic value (e.g., dollars) may be specified for units of an item 35. For example, an enterprise may specify that a unit of item 35 should not be acquired or held unless there is a reasonable expectation (e.g., justified by sales dynamics of item 35) that the unit will yield a profit margin of at least M.

In various embodiments, profit margin may take into account different factors and be expressed or determined in different ways. For example, a minimum margin M may represent the difference between a sales price of a unit of item 35 and all aggregate costs associated with acquiring and holding that unit (e.g., its purchase price, holding costs, and/or other associated costs). In other approaches, some costs may be excluded from a margin determination, depending on accounting practices. While M may be expressed in absolute terms, it may also be expressed as a relative percentage m of another value, such as a purchase price paid or sales price received for a unit of item 35 (indicated respectively as b and p in the above analysis). For example, in various embodiments, M=mb or M=mp. Other suitable definitions or derivations of profit margin may also be employed. It is noted that in some situations, it may be permissible for profit margin to be negative, indicating a loss with respect to an item 35. For example, an item 35 may be treated as a "loss leader" intended to catalyze other more profitable sales.

In one embodiment, the purchase quantity corresponding to a particular offer, denoted Q, may be optimized given the constraint that the purchased units should produce a minimum profit margin M relative to a total available profit margin. Profit margin may typically be determined according to a margin price basis, such as a purchase price paid, sales price received, or a function of these or other prices. As described above, the costs of holding purchased units of an item 35 until sale through sales channel 200 may erode the benefits of a higher sale value versus a current disposition value. Such costs of holding may also erode the realized profit margin for those units. Similar to the holding breakeven time described above, a profit margin breakeven time may be derived for item 35, where the cost of holding a given unit of item 35 until the profit margin breakeven time equals all total available profit margin except the minimum profit margin, within an equality threshold as previously discussed. That is, the cost of holding a unit is equal to the total available margin less the minimum profit margin. For sake of analysis, suppose the total available margin is the expected sale price p less the price corresponding to a particular purchasing opportunity or offer, b (although it is noted that the basis of the total available margin calculation may be a function of either of these prices taken alone, or a more complex measure). According to one embodiment, the minimum profit margin according to a minimum margin rate m may be given as $$M = m(p-b). \quad (12)$$

Then, to determine the profit margin breakeven time, let $$ht_{pm} = (1-m)(p-b), \quad (13)$$

where h denotes holding costs per unit of time for a unit of item 35. Since accumulated holding costs should leave at least m percent of the margin basis, holding costs should not exceed 1−m percent of the margin basis. The profit margin breakeven time, $t_{pm}$, is then given as $$t_{pm} = \frac{(1-m)(p-b)}{h}. \quad (14)$$

As before, the average time rate of sales demand of units of item 35 may be given as D. (For simplicity of exposition, the simple average of demand is used for the following derivations. However, it is noted that alternate expressions, using integral or summation techniques similar to those employed in previous derivations, may be developed that make use of a continuous or discrete functional expression of demand D(t). Such general expressions are contemplated as within the scope of the following discussion.) The optimal quantity of units to be purchased under the terms of the offer being considered may be given as Q*. If the last unit purchased is expected to yield the minimum profit margin, then the total number of units in inventory following a purchase should not exceed the number expected to be sold before the profit margin breakeven time. Thus, $$I+Q^* = Dt_{pm}. \quad (15)$$

Solving for Q* and substituting for $t_{pm}$ yields $$Q^* = \frac{(1-m)(p-b)D}{h} - I. \quad (16)$$

Generally speaking, a purchase should not result in inventory of an item 35 exceeding healthy inventory level H for that item. This constraint can be made explicit in the calculation of Q*:

$$Q^* = \min\left(H - I, \frac{(1-m)(p-b)D}{h} - I\right). \quad (17)$$

Once the purchase quantity has been optimized with respect to a desired minimum profit margin, it is possible to determine the net contribution to overall profit that may be expected from executing the purchase. From the above analysis, the last unit of the purchase quantity, when sold, has a net profit contribution of m(p−b) and is sold after Q*/D time elapses, incurring hQ*/D in holding costs. Correspondingly, the first unit of the purchase quantity, if sold before any substantial holding costs accrue, should contribute hQ*/D+ m(p−b) to the net profit. In embodiments where sales demand is linear over time, the total net profit contribution V* of the units purchased under the terms of the purchase offer may be computed as the average of the contributions of the first and last units sold multiplied by the number of units purchased:

$$V^* = \qquad (18)$$
$$\frac{1}{2}(hQ^*/D + m(p-b) + m(p-b))Q^* = \left(\frac{hQ^*}{2D} + m(p-b)\right)Q^*.$$

In other embodiments, total net profit contribution from the purchase may be computed using other techniques, such as by summing or integrating profit contributions of individual units or groups of units sold.

It may be the case, in some circumstances, that a supplier may make purchase price b contingent upon an enterprise purchasing a minimum quantity Q of units of an item 35. If, after optimizing for a particular minimum profit margin, the optimized purchase quantity Q* is greater than or equal to the minimum required quantity Q, quantity Q* may be purchased without further consideration. However, if Q*<Q, further analysis may be required to determine whether the overall profit contribution of the purchase is still acceptable. As before, the first unit of the purchase quantity sold should still contribute hQ*/D+m(p−b) towards the net profit of the entire purchase. The last unit of the purchase quantity sold will be held for a time of Q/D and incur holding costs of hQ/D relative to the first unit sold, for a net profit contribution of hQ*/D+m(p−b)−hQ/D (i.e., the profit contribution of the first unit sold less the cost of holding the last unit until it is sold). Once again, if sales demand is linear, the total net profit contribution V for the case of purchasing Q units, where Q*<Q, may be determined by averaging the contributions of the first and last units sold:

$$V = \frac{1}{2}(hQ^*/D + m(p-b) + hQ^*/D + m(p-b) - hQ/d)Q \quad (19)$$
$$= hQ^*/D + m(p-b)$$

or by other suitable summation techniques. Whether to engage in the purchase may then be made on the basis of V. For example, if V is within a certain percentage or amount of V*, the purchase may be made for a quantity Q despite the fact that Q*<Q. In some embodiments, if V is unacceptable, a counteroffer may be made. For example, the enterprise may counteroffer with a purchase quantity of Q* rather than Q. Alternatively, the equations given above may be rearranged to solve for the purchase price b that would yield an acceptable profit V for the minimum purchase quantity Q, and the enterprise may counteroffer with a revised purchase price b. The enterprise may also choose to negotiate other aspects of the purchase, such as credit or delivery terms, or may simply choose to decline the offer. Generally speaking, whether a given expected profit is acceptable may depend on whether the given expected profit satisfies an acceptability criterion. Such a criterion may be represented as an absolute amount or as a percentage or relation, for example relative to purchase price, sales price or some other value. An acceptability criterion may also include a function that encompasses other variables or metrics, such as sales projections, sales velocity, marketing plans, or other suitable factors that may influence a decision whether to accept or decline an offer.

As described above with respect to FIG. 4, inventory management system 50 may be configured to analyze an offer to purchase units of an item 35 from a supplier as to the inventory health implications of such a purchase. Similarly, in one embodiment inventory management system 50 may be configured to optimize the quantity of units to be purchased under the terms of a given purchase offer with respect to a minimum profit margin requirement. In one such embodiment, inventory management system 50 may also be configured to determine a net profit contribution associated with the optimized purchase quantity of units, as well as a net profit contribution associated with a minimum required purchase quantity, if any. In some embodiments, inventory management system 50 may also be configured to recommend counteroffer strategies if a purchase offer is found unacceptable, such as by recommending alternative purchase prices or quantities.

Figure 5:
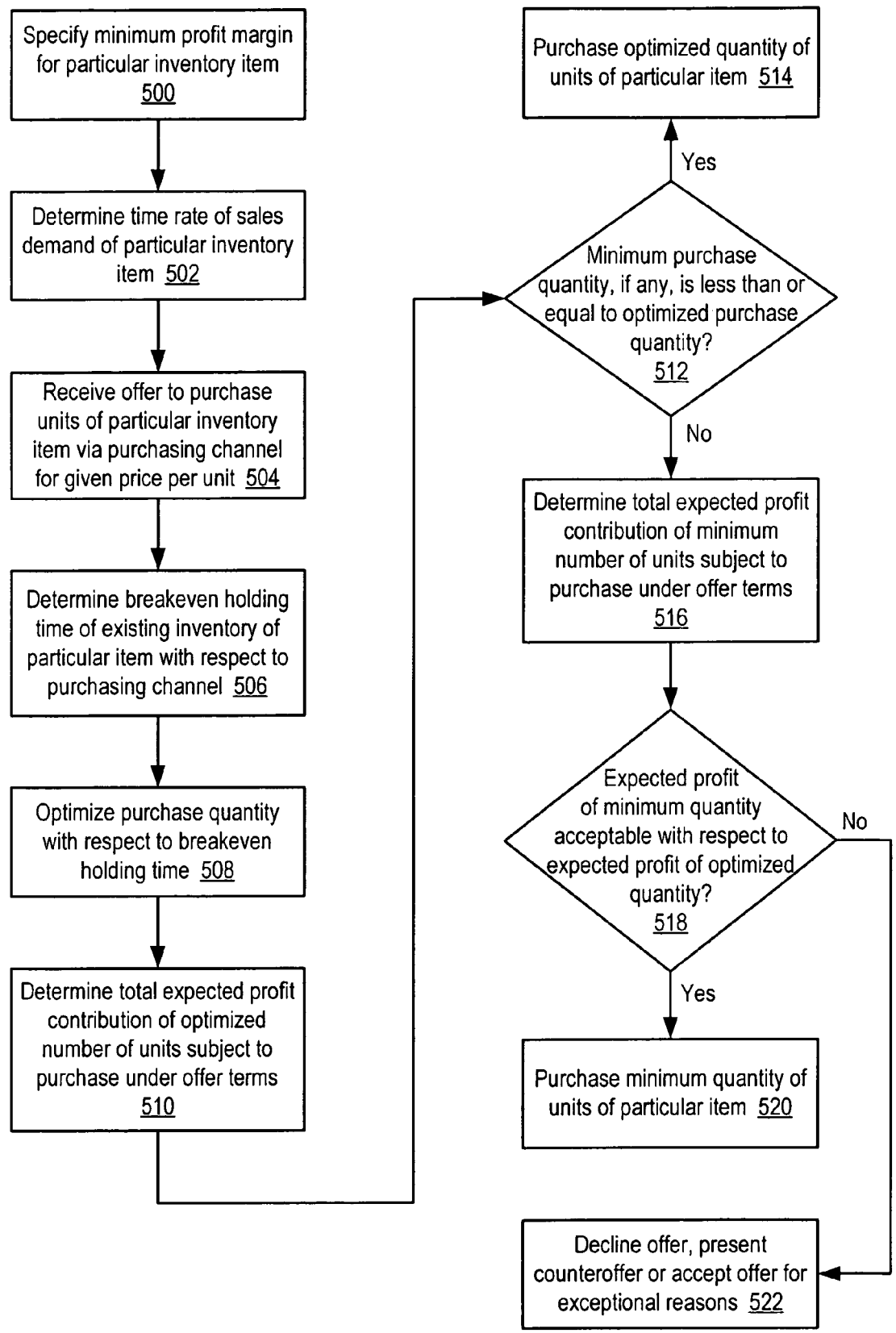
FIG. 5 is a flow diagram illustrating one embodiment of a method of evaluating a purchasing opportunity with respect to purchase quantity and price.

One embodiment of a method of analyzing a purchasing opportunity with respect to purchase quantity and price is illustrated in FIG. 5. Referring collectively to FIGS. 1-5, operation begins in block 500 where a minimum profit margin associated with a particular item 35 is specified. For example, an enterprise may impose a uniform requirement or expectation that all items 35 yield a profit margin of some amount or percentage. Alternatively, different profit margin expectations may be imposed for different types of items 35, such as product classes (e.g., books, music, electronics, appliances, etc.), brands, specific product lines, or individual items 35. It is noted that, as mentioned above, profit margin may be determined in any suitable, consistent fashion, for example as an absolute dollar amount, as a percentage of a purchase price or sale price, as a percentage of gross profit (e.g., a difference between a sale price and a purchase price), etc.

Additionally, the time rate of sales demand of units of the particular item 35 is determined (block 502). In various embodiments, sales demand may be determined through appropriate extrapolation or modeling similar to that described above with respect to block 302 of FIG. 3.

An offer to purchase units of a particular item 35 via a purchasing channel for a given purchase price per unit is received (block 504). As in block 400 of FIG. 4, the offer or a suitable indication of the offer (e.g., a message including the offer details) may be received by inventory management system 50 electronically or by other means, and may or may not specify a minimum purchase quantity. It is noted that in some embodiments, the method of FIG. 5 may be performed after the offer has been analyzed with respect to inventory health as described above with respect to FIG. 4. In some such embodiments, analysis of the offer according to FIG. 5 may be performed contingent upon whether purchase of any quantity of item 35 would render inventory unhealthy with respect to the purchasing channel as described with respect to FIG. 4.

The profit margin breakeven time of particular item 35 is then determined with respect to the offer (block 506). In one embodiment, as described above, inventory management system 50 may be configured to determine the profit margin breakeven time such that the accrued cost of holding a unit of particular item 35 purchased under the offer until the profit margin breakeven time equals, within an equality threshold as previously described, the difference between the total available profit margin for particular item 35 (e.g., according to the basis on which margin is computed) less the minimum profit margin associated with particular item 35. For example, the total available margin may be given as the difference between a sales price and the purchase offer price, p−b, and the minimum profit margin may be given as m(p−b). The difference between these, as described above, may be given as (1−m)(p−b).

The purchase quantity of units of particular item 35 may then be optimized with respect to the profit margin breakeven time (block 508). In one embodiment, inventory management system 50 may be configured to determine an optimized purchase quantity Q* of particular item 35 according to the previously determined profit margin breakeven time and the time rate of sales demand of particular item 35, as described in detail above. In some embodiments, if the optimized purchase quantity as determined on this basis is greater than the difference between the current inventory level I of particular item 35 and a healthy inventory level H (as determined with respect to the purchase channel, e.g., according to the method of FIG. 4), the difference H−I may be selected as the optimized purchase quantity of particular item 35, as described above.

The total expected contribution to net profit of the optimized number of units subject to purchase under the terms of the offer may then be computed (block 510). For example, inventory management system 50 may be configured to compute the net profit V* as the average of the profit contributions of the first and last units sold times the number of units purchased, where the last unit sold has an expected profit contribution of the minimum profit margin and the first unit sold has an expected profit contribution of the minimum profit margin plus the accrued holding cost until the profit margin breakeven time of the last unit sold, as described above. In other embodiments, other types of summation or integration techniques may be used to compute the expected net profit of units of particular item 35 purchased under the terms of the offer.

If a minimum purchase quantity Q is specified by the terms of the purchase offer, and the minimum quantity is less than or equal to the previously determined optimized purchase quantity Q* (applying an appropriate equality threshold if necessary), or if no minimum purchase quantity is specified, the optimized purchase quantity may be purchased (blocks 512-514). If the minimum purchase quantity is greater than Q*, the total contribution to net profit of the minimum purchase quantity of units Q may be computed (blocks 512-516). For example, inventory management system 50 may be configured to compute the net profit of the minimum quantity of units V by averaging the profit contributions of the first and last units sold in a manner similar to that described above for block 510, with the exception that the profit contribution of the last unit sold may be reduced by its holding costs for holding time in excess of the profit margin breakeven time, as described previously. This step is not necessarily contingent upon a comparison of the minimum purchase quantity with the optimized purchase quantity. For example, determination of the net expected profit of the minimum purchase quantity of units V may be performed concurrently with the computation of V in block 510, in some embodiments.

If the net expected profit associated with the minimum purchase quantity Q is acceptable relative to the net expected profit associated with the optimized purchase quantity Q*, the minimum required quantity of units may be purchased (blocks 518-520). For example, if the difference V*−V is less than some absolute or relative threshold quantity (e.g., as a percentage of V*), the offer may be deemed acceptable. In this case, inventory management system 50 may be configured to autonomously initiate or complete the purchasing process, or to advise another entity (e.g., an employee or other agent) that the offer is acceptable and should be pursued.

If the net expected profit associated with the minimum purchase quantity Q is not acceptable, the offer may be declined, or, in some embodiments, a counteroffer may be made (blocks 518-522). For example, in some embodiments inventory management system 50 may be configured to determine a counteroffer purchase price that would render the net expected profit acceptable with respect to the minimum purchase quantity, or conversely, to determine a counteroffer purchase quantity that would render the net expected profit acceptable with respect to the purchase offer price. In some embodiments, inventory management system 50 may be configured to autonomously reject an offer or negotiate a counteroffer with a supplier, or to advise another software or human agent of the strategy that should be employed. Also, in some embodiments a purchase offer may still be accepted even though the net expected profit associated with the minimum purchase quantity Q is not acceptable and no counteroffer is agreed to. For example, such a purchase offer may be deliberately accepted for exceptional reasons that go beyond the analysis factors and logic programmed into inventory management system 50. Such exceptional reasons may include, for example, competitive strategy (e.g., to prevent a competitor from acquiring resources), vendor goodwill, public relations, charitable activity or any other factors not captured by the inventory management model.

It is noted that in some embodiments, not all steps of the method shown in FIG. 5 may occur. For example, if no minimum purchase quantity is specified for a purchase offer, blocks 516 through 522 may be omitted. Also, counteroffer logic may be omitted from inventory management system 50, such that purchase offers are simply rejected if a minimum purchase quantity exceeds the optimized purchase quantity Q* at block 512.

Exemplary Computer System Embodiment

It is contemplated that in some embodiments, any of the methods or techniques described above may be implemented as program instructions and data capable of being stored or conveyed via a computer-accessible medium. Such methods or techniques may include, for example and without limitation, the functions of inventory management system 50, as well as the methods illustrated in FIGS. 3, 4 and 5 and any suitable variations thereof. Such program instructions may be executed to perform a particular computational function, such as inventory health metric generation and analysis, purchase offer analysis, purchase and/or sales management, operating system functionality, applications, and/or any other suitable functions.

Figure 6:
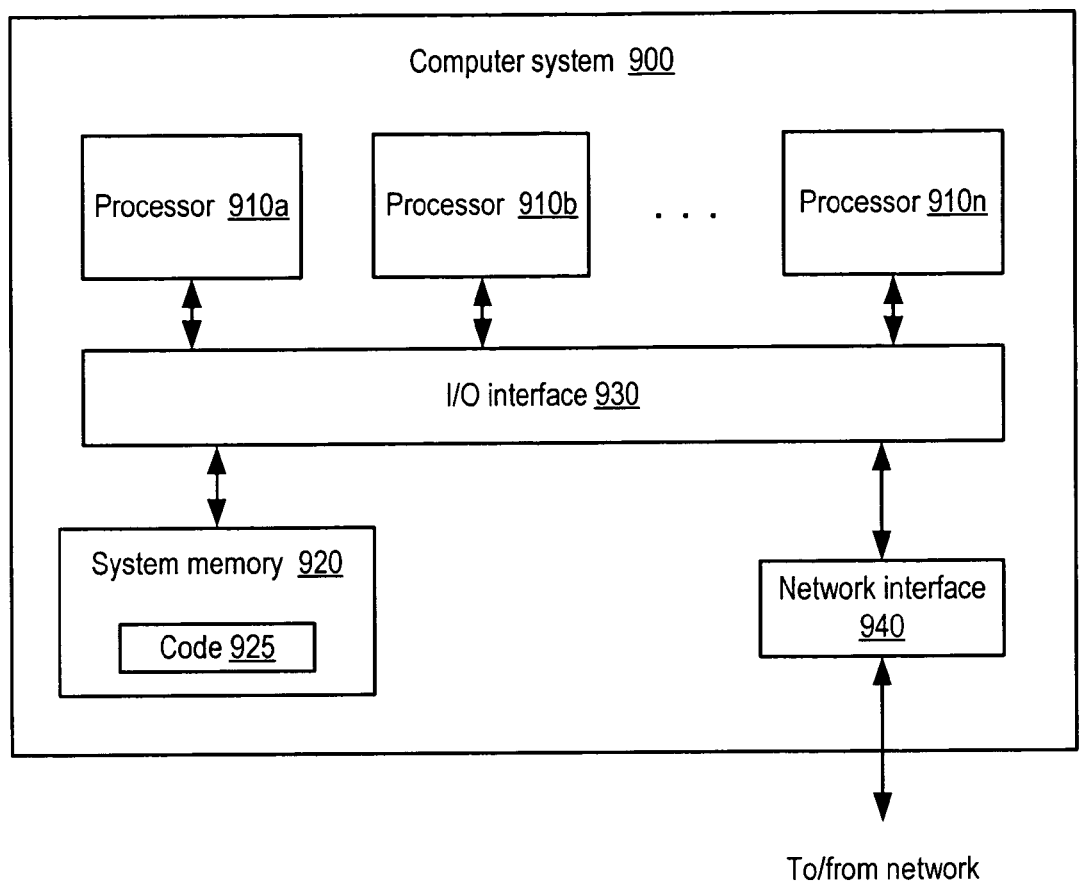
FIG. 6 is a block diagram illustrating an exemplary embodiment of a computer system.

One exemplary embodiment of a computer system including computer-accessible media is illustrated in FIG. 6. In the illustrated embodiment, computer system 900 includes one or more processors 910 coupled to a system memory 920 via an input/output (I/O) interface 930. Computer system 900 further includes a network interface 940 coupled to I/O interface 930. In some embodiments, it is contemplated that inventory management system 50 may be implemented using a single instance of computer system 900, while in other embodiments multiple such systems may be configured to host different portions or instances of inventory management system 50. For example, in one embodiment some data sources or services (e.g., purchasing management services) may be implemented via instances of computer system 900 that are distinct from those instances implementing other data sources or services (e.g., order entry/fulfillment services).

In various embodiments computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by process 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or CD/DVD-ROM coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

Additionally, it is contemplated that any of the methods or techniques described above and illustrated, for example, in FIGS. 3-5 may be implemented as a web service that may be performed on behalf of clients requesting such a service. Generally speaking, providing a function or service as a web service may encompass providing any of a variety of standardized APIs configured to allow different software programs to communicate (e.g., to request services and respond to such requests) in an autonomous, web-based and typically platform-independent manner. For example, an enterprise may choose to expose certain enterprise data (e.g., catalog data, inventory data, customer data or other types of data) and/or certain enterprise functions (e.g., query functions, electronic commerce functions, generic data storage or computational functions, etc.) to external customers (or, in some embodiments, internal clients) via a web services interface. Applications could then access the exposed data and/or functions via the web services interface, even though the accessing application may be configured to execute on an entirely different platform (e.g., a different operating system or system architecture) than the platform hosting the exposed data or functions. Similarly, an enterprise may elect to provide clients with access to inventory management analysis services, such as inventory health determination, purchase offer analysis, counteroffer analysis or other such services. For example, clients may provide inventory details via a web services interface and request various kinds of analysis through that interface. Alternatively, an enterprise may elect to provide physical management of inventory on behalf of clients, and may analyze client-owned inventory in a manner similar to enterprise-owned inventory, exposing the results of such analysis to clients as a web service.

In some embodiments, provisioning a web service may encompass the use of particular protocols which may be executable (e.g., as part of code 925) to publish available web services to potential users, to describe the interfaces of web services sufficiently to allow users to invoke web services properly, to allow users to select and differentiate among web services for a particular transaction, and to provide a format for exchanging web services data in a flexible and platform-independent manner. Specifically, in one embodiment a provider of a web service may register the service using a version of the Universal Discovery Description and Integration (UDDI) protocol, which may function as a general directory through which potential resource users may locate web services of interest. The web service provider may also publish specific details regarding how a well-formed web services request from a user should be formatted (e.g., what specific parameters are required or allowed, the data type or format to be used for a given parameter, etc.). For example, such interface details may be published (e.g., within a UDDI directory entry) using a version of the Web Services Description Language (WSDL).

In many embodiments, web services request and response data is exchanged between a client and the service provider through the use of messages or documents formatted as platform-independent structured data, such as a document formatted in compliance with a version of eXtensible Markup Language (XML). For example, in one embodiment a web services request to provide inventory health information for a given inventory item may be embodied in an XML document including fields identifying the item of interest, the type of data requested (e.g., inventory health data), and possibly other fields, in which each field is delimited by an XML tag describing the type of data the field represents. The response to such a request from the web service provider may include an XML document containing the requested data. In some embodiments, web services-related documents may be transmitted between applications making requests and targeted web services using a web-based data transfer protocol, such as a version of the Hypertext Transfer Protocol (HTTP), for example.

Different types of web services requests and responses may yield XML documents that bear little content in common, which may complicate the handling and interpretation of such documents. For example, in different versions of a free-form XML document specifying a web services request, the actual web service that is requested may appear at different places within different document versions, which may require a recipient of the document to buffer or parse a good deal of document data before understanding what the document is for. Consequently, in some embodiments, the XML documents containing web services request/response data may encapsulated within additional XML data used to define a messaging framework, e.g., a generic format for exchanging documents or messages having arbitrary content. For example, in one embodiment web services requests or responses may be XML documents formatted according to a version of the Simple Object Access Protocol (SOAP), which in various versions may define distinct document sections such as an "envelope" (e.g., which may include a specification of the document type, the intended recipient web service, etc.) as well as a message body that may include arbitrary XML message data (e.g., the particular details of the web services request). However, in some embodiments, web services may be implemented using different protocols and standards for publishing services and formatting and exchanging messages.

Additionally, in some embodiments, a web services system may be implemented without using document-based techniques such as SOAP-type protocols. For example, as an alternative to a document-based approach, a web service may be implemented using a Representational State Transfer (REST)-type architecture. Generally speaking, in REST-type architectures, web services requests may be formed as commands conveyed via a transport protocol, such as PUT or GET commands conveyed via a version of the HTTP protocol. Those parameters of the request that might be embedded within a document in a document-based web services architecture may instead be included as command parameters in a REST-type architecture. Other suitable configurations of web services architectures are possible and contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
receiving an offer to purchase units of an inventory item via a purchasing channel for a given purchase price per unit;
determining a breakeven holding time of existing units of said inventory item, wherein a cost of holding a given existing unit until said breakeven holding time equals, within an equality threshold, a difference between a sale value for sale of said given inventory item through a sales channel and said given purchase price specified by said offer;
determining a time rate of sales demand of units of said inventory item per unit of time;
determining a healthy inventory level of said inventory item, wherein said healthy inventory level exceeds a target inventory level by a function of said time rate of sales demand and said breakeven holding time;
in response to determining that a current inventory level of said inventory item exceeds said healthy inventory level, declining to purchase said units of said inventory item for said given purchase price;
wherein each of said receiving an offer, said determining a breakeven holding time, said determining a time rate of sales demand, said determining a healthy inventory level, and said declining to purchase is performed by one or more computers.

2. The method as recited in claim 1, wherein said time rate of sales demand is represented as an average rate of sales demand, and wherein said function includes a multiplicative product of said time rate of sales demand and said breakeven holding time.

3. The method as recited in claim 1, wherein said time rate of sales demand is represented as a continuous function in time, and wherein said function includes an integral of said continuous function bounded by said breakeven holding time.

4. The method as recited in claim 1, wherein said time rate of sales demand is represented as a discrete function in time, and wherein said function includes a summation of said discrete function bounded said breakeven holding time.

5. The method as recited in claim 1, further comprising purchasing a particular number of units of said inventory item in response to determining that said current inventory level of said inventory item does not exceed said healthy inventory level, wherein said particular number is less than or equal to a difference between said healthy inventory level and said current inventory level.

6. The method as recited in claim 1, wherein said cost of holding said given existing unit of said given inventory item includes a cost of storing said given existing unit.

7. The method as recited in claim 1, wherein said cost of holding said given existing unit of said given inventory item includes an economic cost of capital associated with a purchase price of said given existing unit.

8. A method, comprising:
receiving an offer to purchase units of an inventory item via a purchasing channel for a given purchase price per unit;
determining a breakeven holding time of existing units of said inventory item, wherein a cost of holding a given existing unit until said breakeven holding time equals, within an equality threshold, a difference between a sale value for sale of said given inventory item through a sales channel and said given purchase price specified by said offer;
determining a time rate of sales demand of units of said inventory item per unit of time;
determining a healthy inventory level of said inventory item, wherein said healthy inventory level exceeds a target inventory level by a function of said time rate of sales demand and said breakeven holding time;
in response to determining that a current inventory level of said inventory item exceeds said healthy inventory level, declining to purchase said units of said inventory item for said given purchase price;
specifying a minimum profit margin associated with said inventory item;
determining a profit margin breakeven time of said inventory item, wherein a cost of holding a given unit of said inventory item until said profit margin breakeven time equals, within an equality threshold, a total available profit margin associated with said inventory item less said minimum profit margin; and
determining an optimized purchase quantity of units of said inventory item dependent upon a multiplicative product of said profit margin breakeven time and said time rate of sales demand of units of said inventory item;
wherein each of said receiving an offer, said determining a breakeven holding time, said determining a time rate of sales demand, said determining a healthy inventory level, said declining to purchase, said specifying a minimum profit margin, said determining a profit margin breakeven time, and said determining an optimized purchase quantity is performed by one or more computers.

9. The method as recited in claim 8, further comprising determining a total expected profit from sale of said optimized purchase quantity of units dependent upon an average of a first profit contribution associated with a first-sold one of said optimized purchase quantity of units and a second profit contribution associated with a last-sold one of said optimized purchase quantity of units.

10. The method as recited in claim 9, wherein said first profit contribution exceeds said second contribution by an accrued cost of holding said last-sold one of said optimized purchase quantity of units until said profit margin breakeven time.

11. The method as recited in claim 8, wherein said offer specifies a minimum purchase quantity of units of said inventory item, and wherein the method further comprises determining whether said minimum purchase quantity of units exceeds said optimized purchase quantity of units.

12. The method as recited in claim 11, further comprising purchasing said optimized purchase quantity of units in response to determining that said optimized purchase quantity of units exceeds or equals said minimum purchase quantity of units.

13. The method as recited in claim 11, further comprising declining said offer in response to determining that said minimum purchase quantity of units exceeds said optimized purchase quantity of units.

14. The method as recited in claim 11, further comprising:
in response to determining that said minimum purchase quantity of units exceeds said optimized purchase quantity of units, determining a counteroffer purchase quantity of units for which an expected profit associated with said counteroffer purchase quantity of units satisfies an acceptability criterion; and
presenting a counteroffer to said offer, wherein said counteroffer specifies said counteroffer purchase quantity of units.

15. The method as recited in claim 11, further comprising:
in response to determining that said minimum purchase quantity of units exceeds said optimized purchase quantity of units, determining a counteroffer purchase price per unit for which an expected profit associated with said counteroffer purchase price per unit satisfies an acceptability criterion; and
presenting a counteroffer to said offer, wherein said counteroffer specifies said counteroffer purchase price per unit.

16. A computer-accessible medium comprising program instructions, wherein the program instructions are executable to:
receive an indication of an offer to purchase units of an inventory item via a purchasing channel for a given purchase price per unit;
determine a breakeven holding time of existing units of said inventory item, wherein a cost of holding a given existing unit until said breakeven holding time equals, within an equality threshold, a difference between a sale value for sale of said given inventory item through a sales channel and said given purchase price specified by said offer;
determine a time rate of sales demand of units of said inventory item per unit of time;
determine a healthy inventory level of said inventory item, wherein said healthy inventory level exceeds a target inventory level by a function of said time rate of sales demand and said breakeven holding time;
in response to determining that a current inventory level of said inventory item exceeds said healthy inventory level, indicate that said offer to purchase said units of said inventory item for said given purchase price should be declined.

17. The computer-accessible medium as recited in claim 16, wherein said time rate of sales demand is represented as an average rate of sales demand, and wherein said function includes a multiplicative product of said time rate of sales demand and said breakeven holding time.

18. The computer-accessible medium as recited in claim 16, wherein said time rate of sales demand is represented as a continuous function in time, and wherein said function includes an integral of said continuous function bounded by said breakeven holding time.

19. The computer-accessible medium as recited in claim 16, wherein said time rate of sales demand is represented as a discrete function in time, and wherein said function includes a summation of said discrete function bounded said breakeven holding time.

20. The computer-accessible medium as recited in claim 16, wherein said program instructions are further executable to indicate that a particular number of units of said inventory item should be purchased in response to determining that said current inventory level of said inventory item does not exceed said healthy inventory level, wherein said particular number is less than or equal to a difference between said healthy inventory level and said current inventory level.

21. The computer-accessible medium as recited in claim 16, wherein said program instructions are further executable to:
specify a minimum profit margin associated with said inventory item;
determine a profit margin breakeven time of said inventory item, wherein a cost of holding a given unit of said inventory item until said profit margin breakeven time equals, within an equality threshold, a total available profit margin associated with said inventory item less said minimum profit margin; and
determine an optimized purchase quantity of units of said inventory item dependent upon a multiplicative product of said profit margin breakeven time and said time rate of sales demand of units of said inventory item.

22. The computer-accessible medium as recited in claim 21, wherein said program instructions are further executable to determine a total expected profit from sale of said optimized purchase quantity of units dependent upon an average of a first profit contribution associated with a first-sold one of said optimized purchase quantity of units and a second profit contribution associated with a last-sold one of said optimized purchase quantity of units.

23. The computer-accessible medium as recited in claim 22, wherein said first profit contribution exceeds said second contribution by an accrued cost of holding said last-sold one of said optimized purchase quantity of units until said profit margin breakeven time.

24. The computer-accessible medium as recited in claim 21, wherein said offer specifies a minimum purchase quantity of units of said inventory item, and wherein said program instructions are further executable to determine whether said minimum purchase quantity of units exceeds said optimized purchase quantity of units.

25. The computer-accessible medium as recited in claim 24, wherein said program instructions are further executable to indicate that said optimized purchase quantity of units should be purchased in response to determining that said optimized purchase quantity of units exceeds or equals said minimum purchase quantity of units.

26. The computer-accessible medium as recited in claim 24, wherein said program instructions are further executable to indicate that said offer should be declined in response to determining that said minimum purchase quantity of units exceeds said optimized purchase quantity of units.

27. The computer-accessible medium as recited in claim 24, wherein said program instructions are further executable to:
in response to determining that said minimum purchase quantity of units exceeds said optimized purchase quantity of units, determine a counteroffer purchase quantity of units for which an expected profit associated with said counteroffer purchase quantity of units satisfies an acceptability criterion; and
indicate that a counteroffer to said offer should be presented, wherein said counteroffer specifies said counteroffer purchase quantity of units.

28. The computer-accessible medium as recited in claim 24, wherein said program instructions are further executable to:
- in response to determining that said minimum purchase quantity of units exceeds said optimized purchase quantity of units, determine a counteroffer purchase price per unit for which an expected profit associated with said counteroffer purchase price per unit satisfies an acceptability criterion; and
- indicate that a counteroffer to said offer should be presented, wherein said counteroffer specifies said counteroffer purchase price per unit.

29. The computer-accessible medium as recited in claim 16, wherein said cost of holding said given existing unit of said given inventory item includes a cost of storing said given existing unit.

30. The computer-accessible medium as recited in claim 16, wherein said cost of holding said given existing unit of said given inventory item includes an economic cost of capital associated with a purchase price of said given existing unit.

31. A system, comprising:
- a system memory storing program instructions; and
- a processor coupled to said system memory and configured to execute said program instructions, wherein said program instructions are executable to:
  - receive an indication of an offer to purchase units of an inventory item via a purchasing channel for a given purchase price per unit;
  - determine a breakeven holding time of existing units of said inventory item beyond an expected time of sale of said existing units, wherein a cost of holding a given existing unit until said breakeven holding time equals, within an equality threshold, a difference between a current sale value for sale of said given inventory item through a sales channel and said given purchase price specified by said offer;
  - determine a time rate of sales demand of units of said inventory item per unit of time;
  - determine a healthy inventory level of said inventory item, wherein said healthy inventory level exceeds a target inventory level by a multiplicative product of said time rate of sales demand and said breakeven holding time;
  - in response to determining that a current inventory level of said inventory item exceeds said healthy inventory level, indicate that said offer to purchase said units of said inventory item for said given purchase price should be declined.

32. A method, comprising:
- receiving a web services request to analyze an offer to purchase units of an inventory item via a purchasing channel for a given purchase price per unit;
- in response to receiving said web services request, determining a breakeven holding time of existing units of said inventory item, wherein a cost of holding a given existing unit until said breakeven holding time equals, within an equality threshold, a difference between a sale value for sale of said given inventory item through a sales channel and said given purchase price specified by said offer;
- determining a time rate of sales demand of units of said inventory item per unit of time;
- determining a healthy inventory level of said inventory item, wherein said healthy inventory level exceeds a target inventory level by a function of said time rate of sales demand and said breakeven holding time;
- in response to determining that a current inventory level of said inventory item exceeds said healthy inventory level, generating a response to said web services request, wherein said response includes an indication advising to decline to purchase said units of said inventory item for said given purchase price;
- wherein each of said receiving a web services request, said determining a breakeven holding time, said determining a time rate of sales demand, said determining a healthy inventory level, and said generating a response is performed by one or more computers.

* * * * *

UNITED STATES PATENT AND TRADEMARK OFFICE
CERTIFICATE OF CORRECTION

| | | |
|---|---|---|
| PATENT NO. | : 7,607,577 B1 | Page 1 of 1 |
| APPLICATION NO. | : 11/299860 | |
| DATED | : October 27, 2009 | |
| INVENTOR(S) | : Yu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this

Twelfth Day of October, 2010

David J. Kappos
*Director of the United States Patent and Trademark Office*